000# United States Patent Office 3,261,486
Patented July 19, 1966

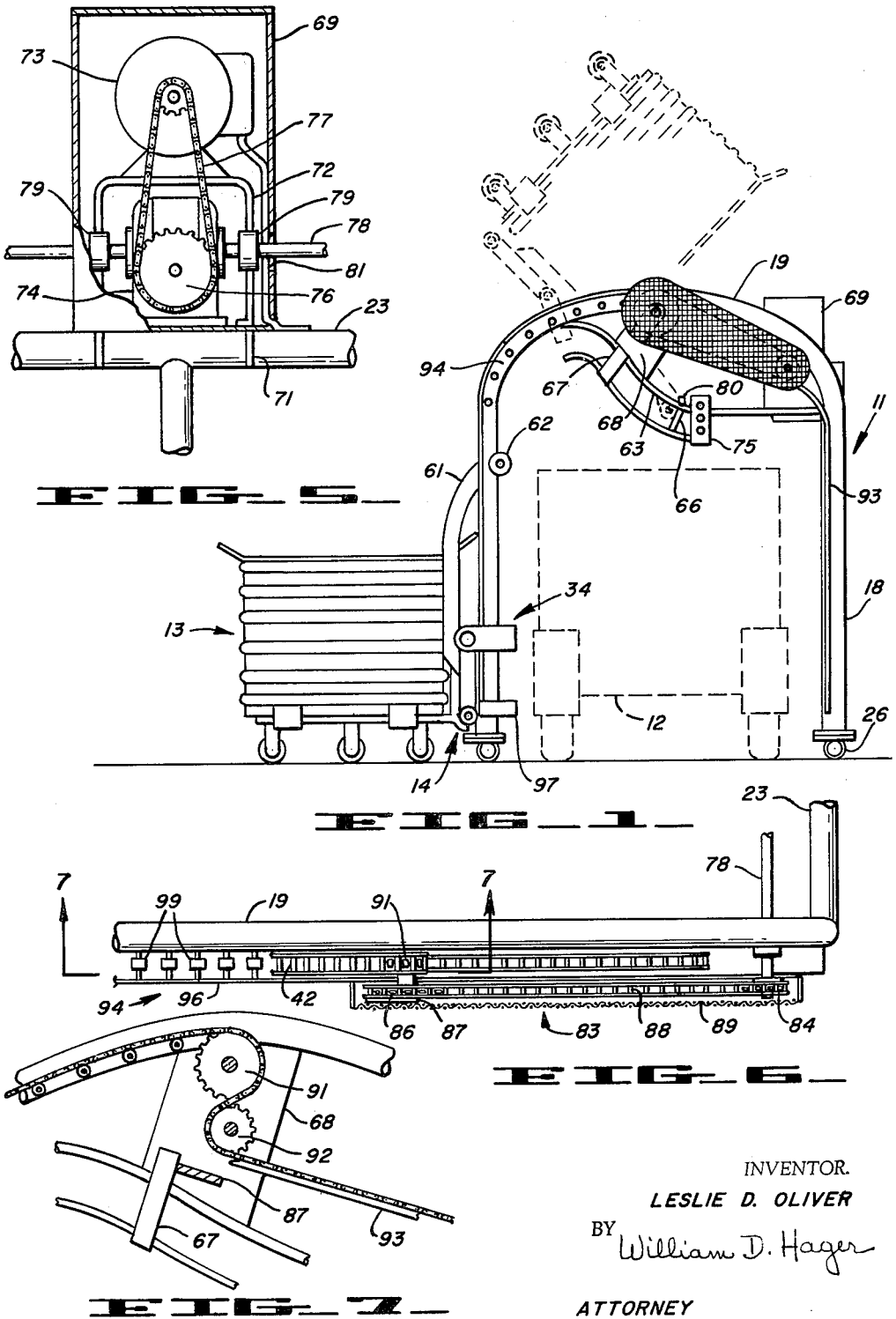

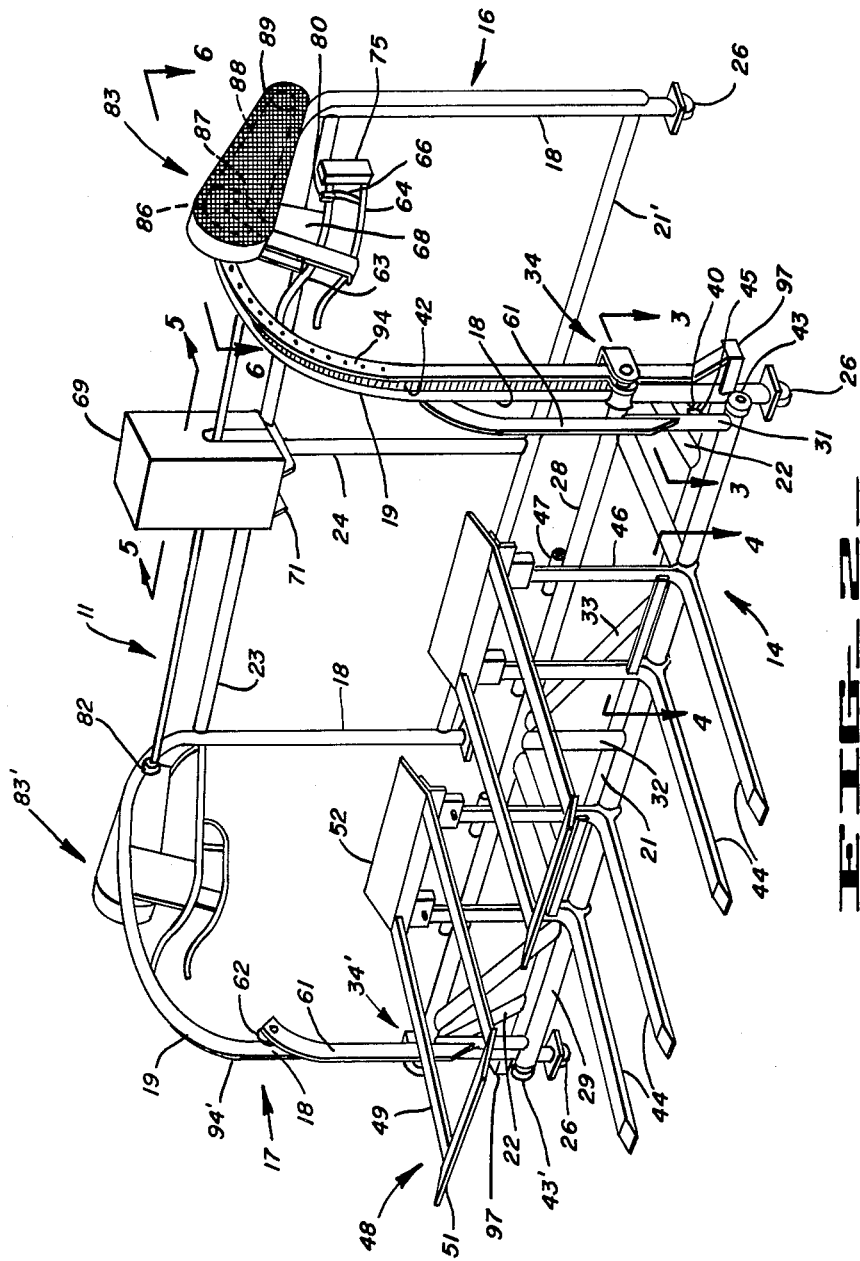

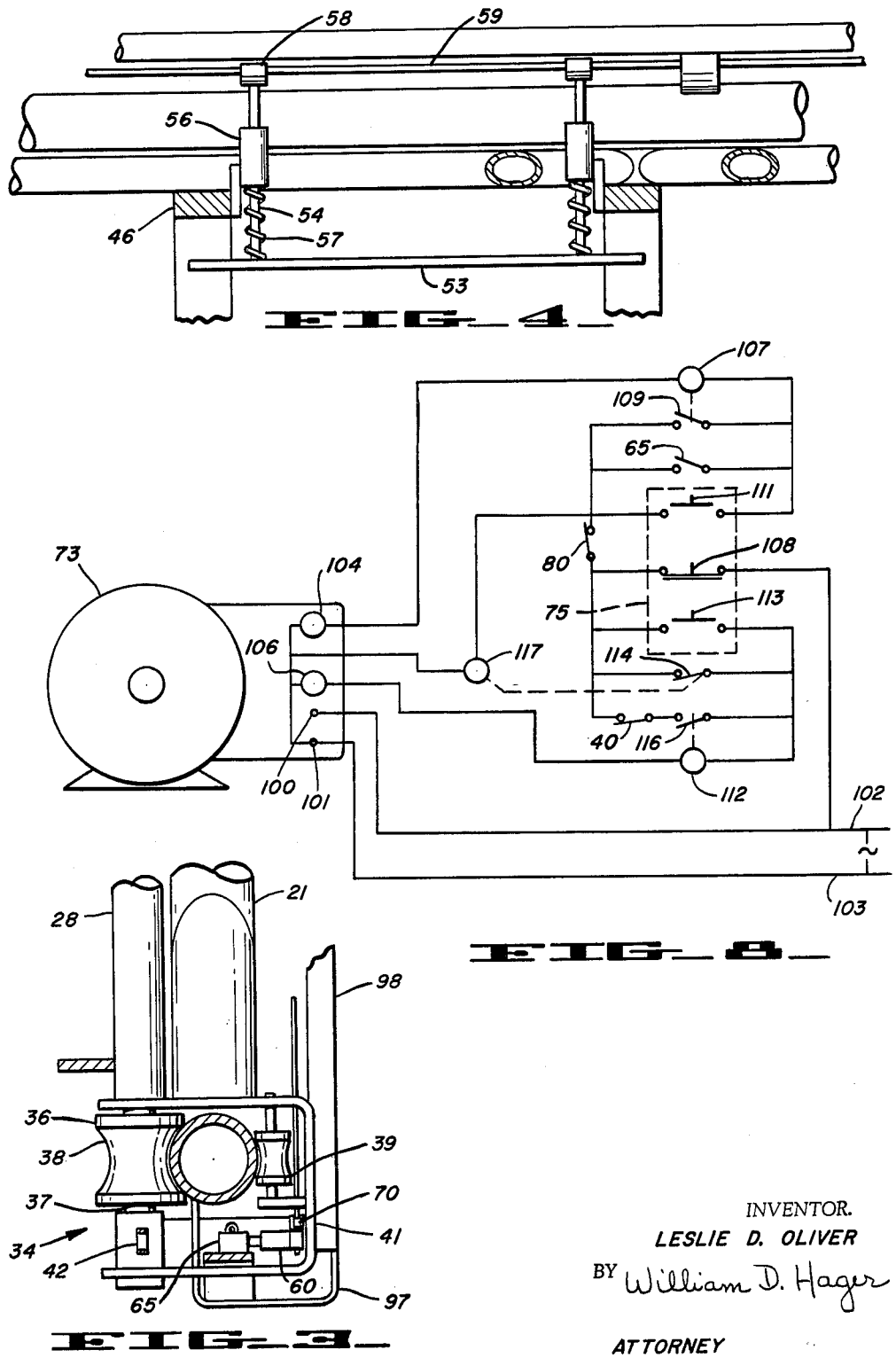

3,261,486
CONTAINER DUMPING MECHANISM
Leslie D. Oliver, 2515 Encinal Ave., Alameda, Calif.
Filed June 24, 1963, Ser. No. 290,019
1 Claim. (Cl. 214—315)

The present invention relates to container handling apparatus and more particularly to a semi-automatic mechanism for lifting and inverting a first receptacle to transfer the contents thereof into a second receptacle. The invention provides, for example, for the dumping of the contents of loaded pushcarts into a large wagon or automotive truck.

In diverse types of industrial operations large containers must be lifted over a truck and inverted to dump materials into the latter. A manipulation of this type is common in connection with refuse collection, mining operations, the handling of bulk grain, and in many other widely varying activities. As a specific example, the invention was developed for use in a can manufacturing plant in which trimmings are collected in large pushcarts which must be dumped into a wagon for subsequent disposal.

While the operation of emptying one container into another appears simple when done manually, a machine designed for this purpose must execute a somewhat difficult sequence of movements. In particular, the first container must be brought adjacent the second and must be securely gripped, the first container must then be lifted, translated horizontally over the second container, and then must be inverted for a predetermined period. The foregoing sequence of movements must then be reversed to return the first container to the initial position.

While complex systems such as conveyers have been utilized for this purpose, these prior mechanisms have several disadvantages. In addition to being costly, relative to the present invention, such systems are inflexible in the sense that the apparatus is installed at a fixed location and cannot readily be moved about for usage under diverse conditions.

In practice, where the expense and inflexibility of a custom designed installation is infeasible, it has been a common practice to make use of a fork-lift industrial truck to perform the dumping operation. However, such trucks were not designed to perform the required manipulations and the use of such trucks for this purpose is inefficient, relatively slow, and sometimes hazardous.

Accordingly there is a need for a relatively simple, portable, safe, and high-speed apparatus for emptying heavy or bulky containers into a truck or other collection receptacle at any selected location and under varying conditions.

To provide such apparatus, the present invention makes use of a framework which forms an arch under which the truck, wagon or other collection receptacle may be positioned. The framework is preferably mounted on castor wheels in order that it may readily be moved from one location to another and may be oriented in any desired direction. A rectangular carriage assembly is slidably mounted on the framework in position to ride up one side thereof and to continue such motion for a distance along the top of the arch, a motor drive being provided to operate the carriage. The carriage is pivotably attached to the framework in such a manner that the lower end thereof may be swung outwardly.

Means are provided on the carriage for engaging the containers which are to be emptied. If, for example, the containers are wheeled carts, such means may be one or more pairs of fork lift blades projecting horizontally from the lower portion of the carriage. Suitable sleeves may be provided on the underside of the cart so that the fork blades enter the sleeves as the cart is pushed toward the side of the frame.

For automatic operation a switch is positioned to be tripped by the movement of the container against the carriage. The switch operates to energize the drive motor and the carriage and container are thus lifted along the side of the frame and are carried horizontally to a position over the collection receptacle which is beneath the arch.

In order to invert the container during the latter portion of the above described movement, one or more elements secured to the carriage are positioned to ride along a track during the motion of the carriage. In a preferred form, the initial portion of the track may be one of the vertical side support members of the frame. The upper portion of the track, however, is formed by a cam rod having a curvature such that the carriage is forced to pivot as it travels in a generally horizontal direction across the top of the arch formed by the frame. Thus as the container moves over the top of the collection receptacle, it is simultaneously inverted, whereby the contents of the container are dropped into the receptacle.

To obtain automatic operation, a switch is positioned to be tripped when the container reaches its inverted position over the collection receptacle. The switch controls a timer which temporarly de-energizes the drive motor to allow the contents of the container to be dumped and subsequently reverses the motor to allow the carriage and container to undergo a reversed sequence of the above-described movements whereby the container is returned to the initial position at the side of the frame and may be disengaged from the dumping mechanism.

Accordingly, it is an object of this invention to provide an efficient mechanism for lifting, horizontally translating, and inverting containers.

It is a further object of the invention to provide a power driven apparatus for dumping the contents of containers into collection receptacles such as wagons, automotive trucks and the like.

It is another object of the invention to provide an apparatus for lifting containers and dumping the contents thereof in which the sequence of motions of the containers are automatically controlled.

It is another object of the invention to provide apparatus for lifting containers over a collection receptacle and for dumping the contents thereof in which the containers are returned to the initial starting position.

It is another object of this invention to provide a container dumping apparatus which may readily be moved from one work location to another.

It is still a further object of this invention to provide a highly versatile, safe, and rapid operating apparatus for dumping the contents of heavy or bulky containers into a collection receptacle.

It is still another object of the invention to provide an automatic power-driven heavy container dumping mechanism which may readily be operated by unskilled personnel with a minimum of instructions.

The invention, together with further objects and advantages thereof, will be better understood by reference to the following specification in conjunction with the accompanying drawings of which:

FIGURE 1 is a front elevation view of an apparatus for dumping the contents of heavy wheeled push carts into a collection wagon or truck, the moved position of certain of the travelable elements of the apparatus being shown by dashed lines, FIGURE 2 is a perspective view of the dumping apparatus of FIGURE 1 with pushcart removed in order to better illustrate the detailed structure of the mechanism, FIGURE 3 is a section view taken along line 3—3 of FIGURE 2 and illustrating details of the mechanism thereof, FIGURE 4 is a section view taken along line 4—4 of FIGURE 2 and showing further details of the mechanism, FIGURE 5 is a section view taken along line 5—5 of FIGURE 2 showing additional detail of the apparatus, FIGURE 6 is a section view taken along line 6—6 of FIGURE 2 showing the drive motor of the apparatus with associated mechanism, FIGURE 7 is a partially broken out view taken along line 7—7 of FIGURE 6 and showing further detail of the drive system of the apparatus, and FIGURE 8 is a circuit diagram showing electrical elements of the apparatus.

Referring now to the drawing and more particularly to FIGURE 1 thereof, the apparatus includes a frame assembly 11 forming an arch and defining a passageway into which a wagon 12 or other collection receptacle may be driven. In this embodiment, the containers which are to be emptied into the wagon 12 are large-wheeled pushcarts 13 which are of a generally rectangular shape and which are open at the top. The carts 13 are initially positioned at one side of the frame assembly 11 and by means of a carriage mechanism 14 are lifted up the side of the frame, translated to a position directly above wagon 12 and inverted whereby the content of the carts is dumped into the wagon.

Considering now the detailed structure of the apparatus, with reference to FIGURE 2, elements of the frame assembly 11 include front and rear arches 16 and 17 respectively which may be formed of tubular steel. Arches 16 and 17 are each of inverted U-shaped configuration and thus have vertical side post portions 18 joined at the top by curvilinear arch sections 19, the spacing of the side posts and the height of the arch sections being sufficient that a collection wagon may be driven under the arches.

At the side of the frame assembly 11 at which loading takes place, a linear horizontal structural member 21 extends between the side posts 18 of arches 16 and 17 near the lower ends thereof. To add rigidity to the frame, short diagonal braces 22 extend between member 21 and the side posts 18 near the junctions therebetween. At the opposite side of frame 11, a second linear structural member 21' extends between the arches 16 and 17 in a position corresponding to that of member 21. A third horizontal member 23 extends between the arches 16 and 17 above member 21' and at the level where side posts 18 join the arch sections 19. To further strengthen the frame 11, a linear vertical member 24 extends between members 21' and 23 at the midpoints thereof.

To facilitate movement of the frame assembly 11, castor wheels 26 are provided at the base of each side post 18 of arches 16 and 17.

To engage the pushcarts which are to be lifted and dumped, the carriage assembly 14 travels along the side posts 18 of arches 16 and 17 and partially across the arch sections 19 thereof, the carriage being at the side of the frame where member 21 is situated. Carriage 14 is formed in part of a rectangular framework having an upper horizontal member 28 connected to a parallel lower member 29 by vertical end members 31, a vertical central member 32, and diagonal bracing 33. The carriage 14 extends the full distance between arches 16 and 17 while the vertical spacing of upper and lower carriage members 28 and 29 is a small proportion of the height of arch side posts 18.

Considering now the manner in which the carriage 14 is slidably and pivotably mounted on the frame assembly 11, with reference to FIGURE 3 in conjunction with FIGURE 2, a roller assembly 34 is disposed at the forward end of carriage member 28, an essentially similar roller assembly 34' being mounted at the opposite end thereof. Roller assembly 34 includes a roller 36 mounted on an axle 37 which projects from the end of the carriage member 28 and having a concave circumferential groove 38 into which the adjacent portion of side post 18 of arch 16 fits, the roller thus being adapted to travel along the arch. To hold roller 36 against side post 18, a smaller inner roller 39 rides along the opposite side thereof, the inner roller being mounted on a U-shaped bracket 41 which encircle the side post with the legs of the bracket being pivotably joined to the axle 37 of carriage member 28. To provide for the lifting of the carriage as will hereinafter be described, one end of a drive chain 42 is secured to axle 37 at a position slightly forward from roller 36.

Referring now again to FIGURE 2, the rear roller assembly 34' at arch 17 is similar to that described above, so that carriage 14 is thus able to travel up the frame 11 and the initially lower portion of the carriage is able to pivot outwardly therefrom. To facilitate the upward travel of the carriage 14, an additional pair of rollers 43 and 43' are rotatably mounted on the forward and rearward ends respectively of the lower carriage member 29 and adapted to ride along the side posts 18 or arches 16 and 17 respectively.

A normally closed base limit microswitch 40 is secured to front arch member 16 in position to be opened by a small projection 45 on carriage member 29 when the carriage is at its lowest position, the switch being a component of the automatic control circuitry to be hereinafter described.

In order to mount the pushcarts on the carriage assembly 14, two pairs of fork lift blades 44 are pivotably attached thereto, the number of pairs of blades which are employed being variable according to the number of carts which it is desired to handle simultaneously. Each blade 44, when in the lowered position, projects horizontally from the lower region of the carriage 27 at right angles to member 29 thereof. Each such blade 44 has a right angled base portion 46 which extends upwardly, past carriage member 28, for a distance substantially equivalent to the height of the carts which are to be lifted. A hinge 47 secures the base 46 of each blade 44 to carriage member 28, the blades thus being enabled to pivot outwardly from the carriage 27.

To forestall loss of part of the contents of an overfilled cart as it is lifted, or during the first portion of the tilting of the cart, a rectangular guard frame 48 is secured to the top of base members 46 of each pair of blades 44, the guard frames projecting outwardly from carriage 27 at the level of the top of the carts and in parallel relationship to the blades. Each such guard frame includes a pair of side members 49 which extend parallel to blades 44, an outer cross member 51 which extends between the ends of the side members and is tilted slightly to form an obtuse angle with respect thereto, and an inner cross-member 52 which extends between the inner ends of the side members. Inner cross-member 52 is tilted slightly in an opposite direction from outer cross-member 51 and is broader as spillage of the contents of the carts is most likely to occur in the direction of the inner cross-member.

Referring now to FIGURE 4 in conjunction with FIGURE 2, means are provided to detect the emplacement of a cart on each pair of blades 44 whereby the lifting action may be automatically started. Such means include a bar 53 disposed a small distance above each pair of blades 44 and a small distance outwardly from the blade bases 46 in position to be depressed toward the latter by the forward face of a cart as it is engaged on the associated pair of blades. To mount each bar 53, a pair of rods 54 extend at right angles therefrom through bushings 56 mounted on the blade bases 46. The rods 54 are slidable within bushings 56 and compression springs 57 are positioned coaxially on the rods between the bushings and the bar 53 to urge the latter outwardly from blade bases 46.

The ends of rods 54 contact inclined arms 58 which project upwardly and outwardly from a starting microswitch actuating shaft 59. Shaft 59 is rotatably mounted along the inside of frame member 28 and, as shown in FIGURE 3, has a crank arm 60 at the forward end which trips a normally open starting microswitch 65 when shaft 59 is rotated by inward movement of rods 54 against arms 58. Owing to the inclination of arms 58, the return or downward movement of the carriage 14 rotates shaft 59 in an opposite direction so that switch 65 is not tripped at that time. To return shaft 59 to the normal angular position thereof after retraction of rods 54, a weight 70 depends from the shaft.

Referring now to FIGURES 1 and 2, it is necessary that the carriage 14 pivot about member 28 as it is lifted in order to at least partially invert the carts at the top of the frame assembly 11. To effect this result, an arm 61 extends upwardly from each end member 31 of carriage 14. The upper extremity of each arm 61 curves inwardly past sidepost 18 of the adjacent arch 16 and 17 and each carries a roller 62 which rides against the inner surface of the sidepost.

As the carriage 14 travels upwardly, the rollers 62 are forced inwardly toward the center of the frame assembly 11 by the arch sections 19 thereof, thereby causing the lower portion of the carriage to pivot outwardly from the frame. Such pivoting, however, is not sufficient to tilt the carts 13 for emptying and, accordingly, a curved cam rod 63 is mounted beneath each arch section 19 to intercept rollers 62 and to force the rollers to travel downwardly as the carriage reaches the arch sections 19. To provide an increasing degree of tilt as the carts 13 approach a central position above the underlying collection receptacle or wagon 12, the upper ends of the cam rods 63 are attached to the arch sections 19 at a position to intercept the rollers 62 approximately at the time that the upper edge of the cart 13 reaches the arch sections, the cam rods being curved downwardly from the arch sections with an initially increasing gradient and with a slightly decreasing gradient as the point of maximum travel of rollers 62 is approached. For rigidity, the lower ends of cam rods 63 extend to the opposite sideposts 18.

It will be apparent from the foregoing that the optimum curvature and positioning of the cam rods 63 are determined by such factors as the proportioning of the arch sections 19 of the frame, the length of arms 61 of carriage 14, and the degree of final tilt of the carts 13 which is desired, such factors being variable in different embodiments of the invention.

To prevent the carriage from pivoting any further than is necessary at the top of frame 11, a guard rod 64 is mounted beneath each cam rod 63. The guard rods 64 have a curvature similar to that of the cam rods 63 and are spaced a distance therebelow just sufficient to accommodate the travel of rollers 62 along the cam rods. To support the guard rods 64, a first cross-member 66 extends from the lower end of each such rod to the associated cam rod 63, serving also as a stop for the rollers 62, and a second cross member 67 extends from the upper portion of each guard rod to a plate 68 which is secured between the associated cam rod 63 and the center of arch 19. To avoid interference with the movement of rollers 62, the second cross-members 67 are of U-shaped configuration.

A manual control switch housing 75 is mounted on the forward cam rod 63 and guard rod 64 at the lower end of the latter and a normally closed top limit microswitch 80 is mounted on the cam rod in position to be tripped by roller 62 when cart 13 has been inverted at the top of the apparatus.

Referring now to FIGURE 5 in conjunction with FIGURE 2, a rectangular drive motor housing 69 is mounted on brackets 71 which project inwardly from the central portion of frame member 23. An inverted U-shaped support 72 is secured within housing 69 and an electrical motor 73 is mounted thereon. A speed reducing gear mechanism 74 is mounted beneath support 72 and has a torque input gear 76 coupled to motor 73 by a belt 77.

A drive shaft 78 extends through gearbox 74 and is coupled to the torque output thereof, the shaft being journalled in bearings 79 mounted in the legs of support 72 and extending through slots 81 in the sides of the housing 69. The ends of shaft 78 extend through additional bearings 82 mounted at arches 16 and 17. The drive shaft 78 delivers torque to hoisting assemblies 83 and 83' at the top portions or arches 16 and 17 respectively.

The detailed structure of hoisting assembly 83, to which assembly 83' is similar, is best understood by reference to FIGURES 6 and 7 in conjunction with FIGURE 2. A gear 84 is mounted coaxially on the end of drive shaft 78 and a larger gear 86 is journalled between plate 68 at the top of arch 16 and an angled bracket 87 secured thereto, the two gears being coupled by a chain belt 88 and covered by a protective guard 89. An additional gear 91 is secured to the same axle as gear 86, between gear 86 and plate 68, and the lifting chain 42 from carriage 14 is engaged thereon. An idler gear 92 is journalled to plate 68, below gear 91, and the chain passes around gear 92 which thereby functions to hold the chain in engagement on gear 91. The free end of chain 42 is slidingly disposed along an inclined shelf 93 which extends to sidepost 18 of arch 16 and turns downwardly therealong.

To support chain 42 between the carriage 14 and hoisting assembly 83, a roller track 94 is disposed along the intervening portion of arch 16, a similar structure 94' being mounted on the rear arch 17. Track 94 includes a flat member 96 having a curvature similar to that of the adjacent portion of the arch 16 and disposed a small distance forwardly therefrom. Member 96 extends from the region of hoisting assembly 83 to a point near the base of sidepost 18 of arch 16. The lower extremity of member 96 is angled forwardly and joined to the forward portion of a U-shaped bracket 97 which has one leg secured to the sidepost 18 as better shown in FIGURE 3. An angle member 98 extends between the second leg of bracket 97 and the corresponding bracket 97 at rear arch 17 to protect the microswitch mechanism adjacent frame member 21.

Referring now again to FIGURE 6, a series of spaced rollers 99 are journalled between arch 16 and member 96 along the curved portion of the arch to provide the track for chain 42.

Considering now the control circuitry associated with the foregoing apparatus, and with reference to FIGURE 8, alternating current is supplied to power terminals 100 and 101 of drive motor 73 through first and second conductors 102 and 103. Motor 73 is of the type having a relay operated input 104 for initiating operation in a first direction, to produce upward motion of the carriage in this case, and a second relay operated input 106 for initiating operation in the reverse direction. Input 104 is connected to power conductor 101 through a hold relay coil 107, normally closed top limit microswitch 80 and a normally closed manual stop switch 108, which is located in the control switch housing 75. The connection between hold relay coil 107 and top limit microswitch 80 is through three paralleled switches which include a normally open relay switch 109, operated by the hold coil 107, normally open starting microswitch 65 which is operated by emplacement of the pushcarts as hereinbefore described, and a normally open manual starting switch 111, which is also situated in the control housing 75.

Thus upward motion of the carriage may be initiated either by manually closing starting switch 111 or by the automatic closing of start microswitch 65 which results from the emplacement of a cart on the carriage. In either case, hold relay coil 107 is thereby energized and functions to close switch 109 so that power continues to be supplied to motor input 104 after the starting switch 65 or 111 opens.

The upward drive from motor 73 is stopped, when the carriage has reached the upper limit of its travel, by the automatic opening of top limit switch 80 as hereinbefore described. This action also de-energizes hold coil 107 allowing relay switch 109 to return to the initial open position thereof.

To provide for downward motion of the carriage, motor input 106 is connected to power conductor 101 through a second hold relay 112 and the manual stop switch 108. Three parallel connections are provided between coil 112 and stop switch 108, one being a normally open manual "down" switch 113 located on housing 75, the second being a normally closed relay switch 114 which is operated by a timer to be hereinafter described, and the third being a normally closed relay switch 116, operated by hold coil 112, which is in series with the normally closed base limit switch 40.

A time delay relay coil 117 is connected between power conductor 102 and the junction between top limit switch 80 and the manual start switch 111, the coil being operatively coupled to relay switch 116.

Downward motion of the carriage is normally initiated automatically by the opening of the top limit switch 80. Such action de-energizes time delay relay coil 117, thereby closing relay switch 114 after an interval. The closing of switch 114 couples power to motor input 106 causing the motor 73 to operate in a reverse direction. As the current to input 106 passes through hold relay coil 112, the hold coil closes switch 116, thereby maintaining the current to the input after top limit switch 80 has again closed and energized the time delay relay coil 117. It will be noted that downward motion of the carriage may also be initiated by closing the manual switch 113, the subsequent action of the circuit being similar to that brought about by automatic closing of relay switch 114.

Downward drive is terminated by the opening of base limit switch 40 which opens the hold coil controlled switch 116 and returns all components of the circuit to the initial condition.

It will be apparent that many variations in the described structure are possible without departing from the spirit and scope of the invention. Thus it is not intended to limit the invention except as defined in the following claim.

What is claimed is:

An apparatus for discharging the contents of containers into a collection receptacle comprising, in combination:
(a) a movable frame formed by spaced apart upright arch members of inverted U-shaped configuration which are connected by a plurality of horizontal frame members, said frame forming a passage normal to said arch members along which said collection receptacle may be moved into said frame,
(b) a movable carriage extending between said arch members of said frame and having first rollers at each end which ride against said arch members whereby said carriage may be traveled up one side of said frame and partially across the top thereof in a direction transverse to said passage,
(c) means on said carriage for engaging said containers thereon,
(d) a track extending along each of said arch members along the upper portion of the path of said carriage thereon,
(e) a pair of lift chains, each being connected to said carriage and being carried in said track on a separate one of said arch members of said frame,
(f) a pair of drive gears, one being mounted adjacent each of said arch members and having the adjacent one of said chains engaged thereon,
(g) a motor mounted on said frame and operatively coupled to each of said drive gears,
(h) a pair of second rollers, each being mounted at a separate end of said carriage in spaced apart relationship to said first roller thereat, and
(i) a curvilinear rod secured to each of said arch members for guiding said second rollers along a path which deviates from that of said first rollers as said carriage travels across the top of said frame whereby said carriage is caused to pivot about said first rollers, thereby at least partially inverting said containers at the top of said frame, said second rollers being mounted on arms which project upwardly from said ends of said carriage, said second rollers being positioned to ride against the inside of the associated arch member during the initial portion of the upward travel of said carriage, and wherein said curvilinear rods are connected to the inside of said arch members in position to intercept said second rollers prior to the final portion of said travel of said carriage, said rods having a curvature which carries said second rollers downwardly during said final portion of said travel.

References Cited by the Examiner
UNITED STATES PATENTS

| | | | |
|---|---|---|---|
| 1,028,762 | 6/1912 | Lutze | 214—313 X |
| 1,458,241 | 6/1923 | Otterson | 214—707 X |
| 1,520,538 | 12/1924 | Dodge | 214—315 |
| 2,411,228 | 11/1946 | Poulsen | 214—46.3 X |
| 2,589,342 | 3/1952 | Christensen | 214—313 |
| 2,905,344 | 9/1959 | Hostetler et al. | 214—314 |
| 2,906,419 | 9/1959 | Visco et al. | 214—302 |
| 3,035,725 | 5/1962 | Beaman et al. | 214—315 X |

FOREIGN PATENTS 359,647   2/1962   Switzerland.

MARVIN A. CHAMPION, *Primary Examiner.*

GERALD M. FORLENZA, *Examiner.*

J. DEWHIRST, A. GRANT, *Assistant Examiners.*